Patented July 20, 1943

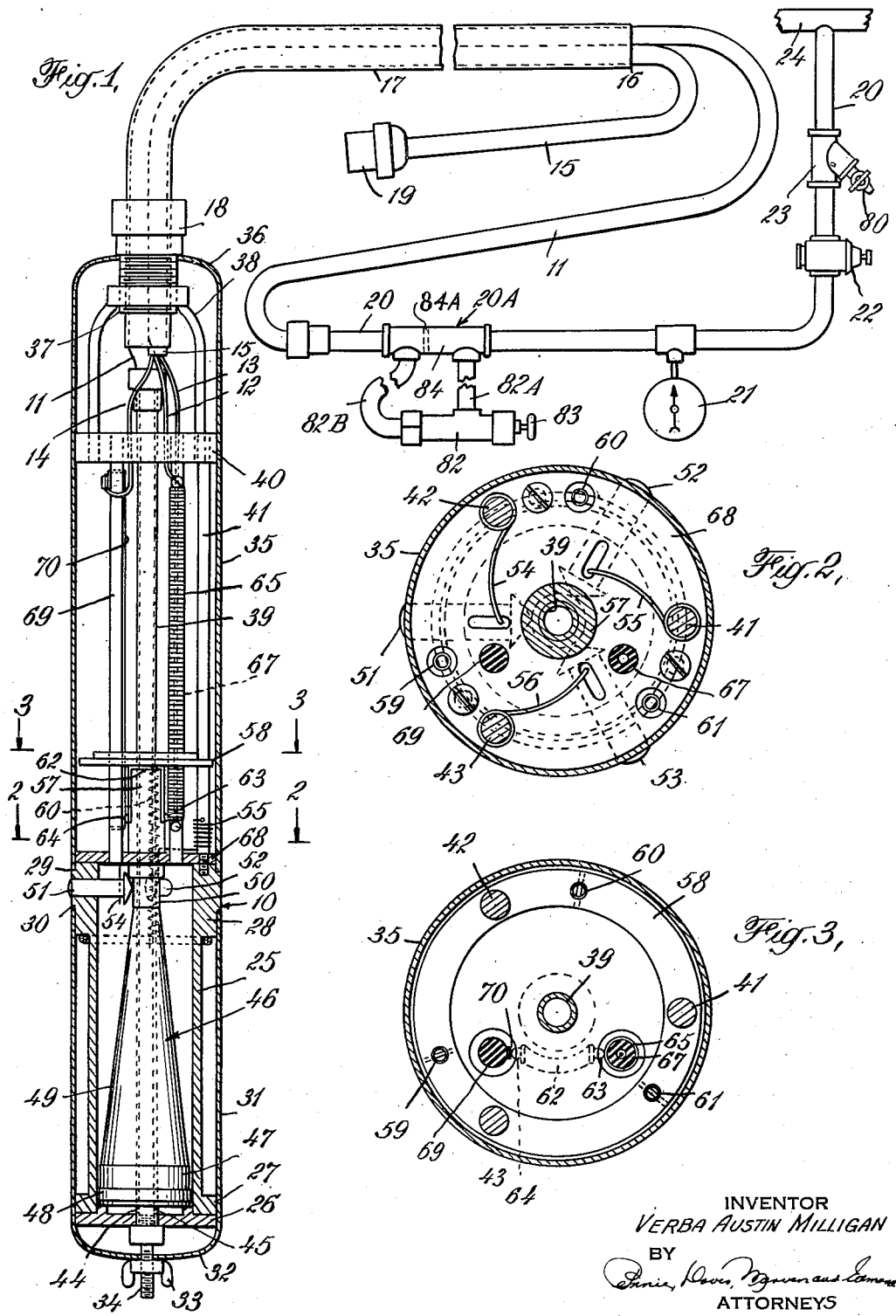

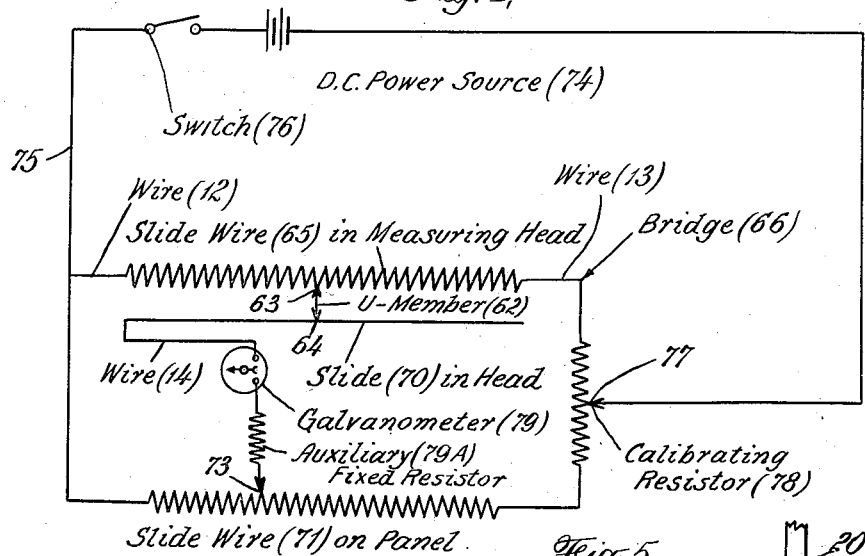
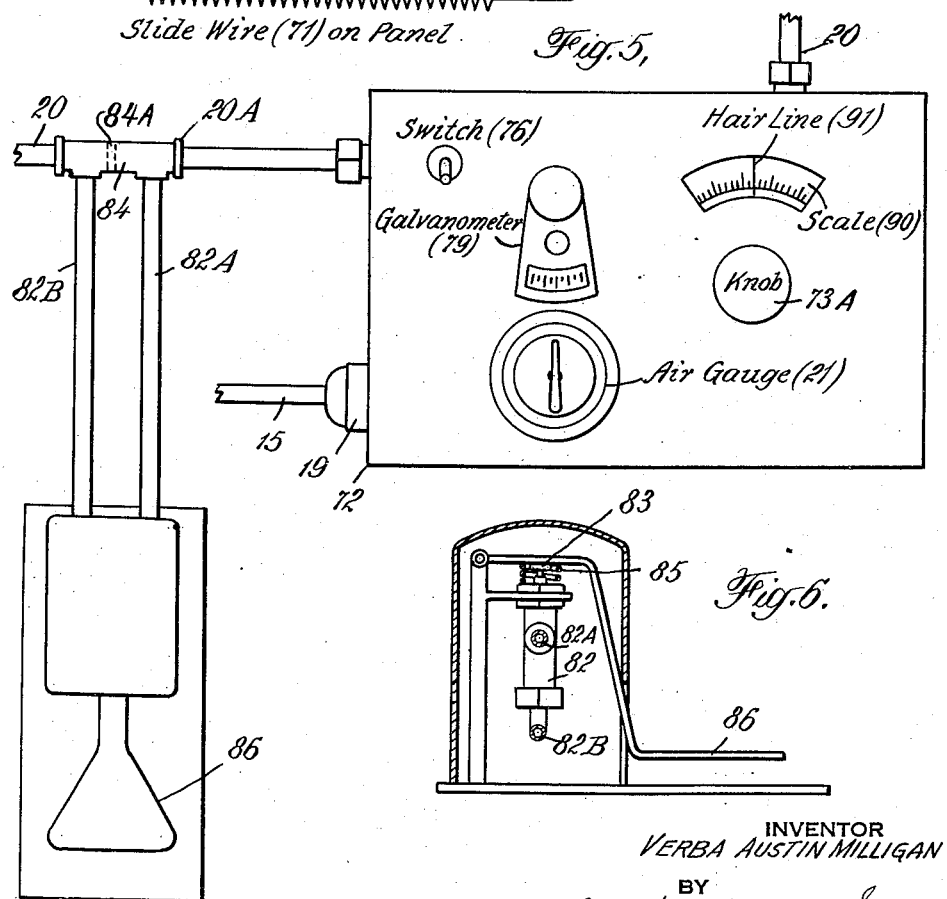

2,324,865

UNITED STATES PATENT OFFICE 2,324,865

TUBE CALIPER

Verba Austin Milligan, Pasadena, Tex., assignor to Sinclair Refining Company, New York, N. Y., a corporation of Maine Application May 1, 1941, Serial No. 391,340

12 Claims. (Cl. 33—178)

This invention is concerned with tube calipering, i. e., the determination of interior cross sectional dimensions of elongated conduits, particularly conduits that are difficult of access. The invention provides an improved tube caliper that may be put to a variety of uses but which is particularly adapted for use in tubes such as those employed in boilers, oil stills and the like.

Oil stills and boilers are operated at high temperature and pressure and are subject to erosion and corrosion. It is advisable, at frequent intervals, to caliper the tubes and pipes of such equipment to determine whether or not the wall thickness of the tubes is sufficient. Thus, the tubes and lines of a tubular oil still may be calipered during shut-down periods following removal of "coke" etc. from the tubes and before the still is again placed in operation. A relatively minor decrease in the wall thickness of the tubes may bring about a very dangerous operating condition, and it is important that the caliper employed shall be positive and accurate. The apparatus of my invention fulfills these requirements and offers a further advantage, for in its preferred form it may be employed to caliper hot tubes. Hence there need be no delay incident to cooling prior to the calipering or measuring operation.

The apparatus of my invention provides a measuring head adapted to be placed within the tube to be calipered, for example, by being drawn therethrough. Essentially, the measuring head is a cylinder having a tapered piston slidable therein and provided with a plurality of radially spaced feelers mounted in the wall of the cylinder and movable transversely with respect thereto so as to engage the interior surface of the tube undergoing investigation. The inner ends of the feelers are operatively associated with the tapered portion of the piston and are slidable with respect thereto. The position of the tapered piston with respect to the cylinder is governed by the position of the feelers, which in turn is governed by the dimensions of the tube at the particular cross section engaged by the feelers. Consequently, the position of the tapered piston with respect to the cylinder or with respect to the feelers is an index of the cross sectional dimensions of the tube.

Conveniently, the measuring head or cylinder is fastened to the end of a cable within which is a conduit such as a flexible hose for admitting fluid, say, air or other gas, under pressure to the measuring head. The cable also sheaths a plurality of wires which comprise part of an electrical measuring circuit which is described in detail hereinafter, and which is adapted to determine the position assumed by the piston with respect to the cylinder for any particular cross section of the conduit being investigated. The cable conveniently is calibrated (say in feet and inches) so that the distance between the end of the tube and the point at which its cross section is calipered may be known. In summary then, my invention contemplates the combination in a tube caliper which comprises a measuring head or cylinder adapted to be disposed within the tube to be calipered and in approximate alignment therewith, a tapered and preferably conical piston slidable in the cylinder, a plurality of radially spaced feelers (preferably three in number) projecting through and movable transversely with respect to the wall of the cylinder, the outer ends of the feelers being adapted to engage the inner surface of the tube with the inner ends of the feelers in operative association with the tapered portion of the piston as by being in slidable contact therewith, means for sliding the piston in the cylinder, and means for determining the relative position of the piston with respect to the cylinder when the feelers are in contact with the inner surface of the tube.

Means should be provided for assuring that the feelers are in contact with the tapered portion of the piston as this is moved back and forth in the cylinder. Thus, each feeler may be provided with a spring which causes the feelers to bear against the piston but does not prevent the movement of either feelers or piston.

In the preferred form of my apparatus, the means for determining the position of the piston with respect to the cylinder is an electrical circuit including a resistance element mounted in fixed relationship to the cylinder substantially parallel to the axis thereof, a contact mounted in fixed relationship to the piston and slidable along the resistance element and a current indicating means for indicating changes in current in the circuit brought about as the result of change of position of the slider with respect to the resistance element. Thus, the electrical circuit may include a first resistance element mounted in fixed relationship to the cylinder and substantially parallel to the axis thereof, a first slider mounted in fixed relationship to the piston and slidable along and in contact with the first resistance element, a bridge network having the first resistance element connected in one leg thereof, a second resistance element connected in the other leg of the bridge network, a second slider movable in contact with and along the second resistance element and current indicating means connected between the two sliders. Such a circuit is, of course, provided with a current supply.

In the preferred form of my apparatus, the cylinder is closed at one end and the large end of the tapered piston is disposed adjacent thereto. A fluid, say air, is admitted under pressure to the space between the end of the cylinder and the end of the piston to cause the piston to move with respect to the cylinder and force the feelers outwardly against the wall of the tube being calibrated. Preferably, means are provided to permit fluid to escape from the space to pass in contact with the feelers to keep them cool and clean. Conveniently, sufficient clearance is left between the end of the piston and the sides of the cylinder to allow gas to escape into the cylinder around the tapered portion of the piston and thence into the tube through the apertures in which the feelers are mounted. These and other features of my invention will be apparent in the light of the following detailed description of a presently preferred form of my apparatus taken in conjunction with the accompanying drawings in which:

Fig. 1 is an elevation, partly in section, of a preferred form of measuring head of the apparatus of my invention provided with air and electrical connections;

Fig. 2 is a cross-section of the measuring head of Fig. 1 taken along the line 2—2;

Fig. 3 is another cross-section of the measuring head of Fig. 1 taken along the line 3—3;

Fig. 4 is a wiring diagram of my apparatus including slide wires of the measuring head of Fig. 1 in a modified Wheatstone bridge circuit;

Fig. 5 is a plan of an instrument panel and foot controlled air valve for use in conjunction with the apparatus of Fig. 1; and Fig. 6 is an elevation, partly in section, of the foot control for the valve of Fig. 5.

Referring now to Fig. 1, it will be observed that the apparatus comprises a measuring head 10 (adapted to be inserted in a tube to be calipered) provided with an air connection in the form of a flexible hose 11 and electrical connections in the form of wires 12, 13, 14 enclosed at one end in an auxiliary insulating sheath 15. The air hose and the wires, which may be wound around it are enclosed adjacent the measuring head in a main sheath 16 to form a cable 17 that is fastened to the upper end of the measuring head by a bushing 18.

The air hose and the wires in the auxiliary sheath emerge from the main sheath of the cable at the unfastened end thereof, and the three wires are connected respectively to the prongs of a three-prong receptacle 19 by means of which the electrical elements of the measuring head are connected to the bridge circuit of Fig. 4. The air hose is connected to a pipe 20 provided with a flow control mechanism 20A (the details of which are illustrated in Figs. 5 and 6), a pressure gauge 21 (Figs. 1 and 5) a reducing valve 22, a filter 23 and a high pressure air supply 24.

To consider the measuring head in detail, it comprises an aluminum cylinder 25 closed at its lower end by a detachable aluminum head 26, fastened to a flange 27. The wall of the cylinder adjacent the upper end constitutes a feeler block 28, provided with an upper shoulder 29, and a lower shoulder 30. A cylindrical lower housing 31 having a domed cap 32 is disposed around the cylinder with its upper end fitting snugly over the lower shoulder and held in place by a wing nut 33 that is screwed on a stud 34 projecting from the bottom of the cylinder head through the cap. A cylindrical upper housing 35 with a domed cap 36 is fitted snugly on the upper shoulder of the feeler block and encloses the measuring head above its cylinder. The upper housing is held in place by the bushing 18 by means of which the air hose and the wires enter the head. The bushing comprises a cable sealing connection 37 with a male thread that is screwed into a top housing anchor or yoke 38.

The air hose of the cable is connected in the top of the measuring head to a centrally disposed air tube 39 that is held in place adjacent its upper end by a top plate 40 of Bakelite or other heat-resistant non-conductive material. The housing anchor 38 is fastened to the top plate, which is supported by tie rods 41, 42, 43 that extend downwardly and are threaded into the feeler block.

The lower end of the air tube is threaded into the cylinder head that closes the bottom of the cylinder and communicates with the bottom of the cylinder through holes 44, 45 bored in the tube wall.

The air tube serves as a guide rod for a tapered piston 46 slidably mounted in the cylinder with its big end down and has a passage to accommodate the air tube. The lower end 47 of the piston is cylindrical and carries a gasket or ring 49 of Neoprene or similar oil resistant material. The gasket and the piston have sufficient clearance with respect to the cylinder wall to permit the passage of a small amount of air (say 1 cubic foot per hour) into the upper portion of the cylinder. The intermediate portion 49 of the cylinder is frusto-conical and merges into a short upper portion 50 that is cylindrical and of small diameter. The upper portion of the cylinder is adjacent the feeler block when the piston is in its lowermost position in the cylinder.

Three feelers 51, 52, 53 project through holes in the feeler block perpendicular and radially to the axes of the cylinder. They are spaced equiangularly—i. e. at 120° from each other (see Fig. 2). The feelers are provided respectively with small leaf springs 54, 55, 56 which hold the inner ends against the piston. The outer ends of the feelers are rounded and project from the feeler block to engage the inside wall of a tube being calipered. If desired, the feelers may be provided with extensions (not shown) to adapt the measuring head for calipering tubes of large diameter. The holes in the feeler block are large enough to permit air escaping from the cylinder to pass outwardly along the feelers and thus cool and clean them.

The piston is provided with an extension 57 that projects above the cylinder and carries a circular plate 58 of insulating material disposed coaxially with the piston and cylinder. Three helical springs 59, 60, 61 are attached at their upper ends equidistant from each other around the periphery of the plate and at their lower ends to the feeler block. These springs tend to hold the piston in the cylinder and are placed under tension when the piston is forced upward.

A U-shaped member 62 of copper or other conductive material is mounted off-center of the air tube on the under face of the plate 58 and has sliders 63, 64 on its ends. One of the sliders (63) is adapted to move on a slide wire 65 that forms one leg of a modified Wheatstone bridge 66 (the balance of which is outside the measuring head, see Fig. 4 and is connected to the slide wire by the wires 12, 13 that pass through the cable). Thus, the slide wire 65 is a coil of manganan wire wound around a core or rod 67 of insulating material. This rod is fastened at its upper end to the top plate 40 and is held in place at its lower end by a spacer ring or disc 68 fastened to the top of the cylinder. A companion rod 69 is mounted symmetrically with respect to the slider and carries a slide 70 connected at its upper end to the wire 14 of the cable. The slider or contactor (64) bears against the slide 70 which conveniently is a bare copper strip of low resistance.

To consider the electrical aspects of the apparatus, reference should be had to Fig. 4, wherein the slide wire 65 of the micrometer head is shown in one side of the bridge 66, the other side of which contains a slide wire 71 that is mounted outside the measuring head and conveniently on an instrument panel 72 (Fig. 5) and preferably is electrically identical to the slide wire 65. A slider 73 is movable along the slide wire 71, for example, by means of a rotatable knob 73A on the instrument panel.

Direct current is supplied to the bridge and to the two slide wires connected in parallel with each other from a current source 74 (for example a pair of 1½ volt flashlight batteries in series). Thus, one side of the power source is connected to the bridge by a lead 75 provided with a simple switch 76 and the other side of the power source is connected to the opposite end of the bridge through a slider 77 of a calibrating resistor 78 disposed in this end of the bridge and connected through respective ends to the slide wires in opposite sides of the bridge.

A galvanometer 79 (mounted on the panel as shown in Fig. 5) is connected across the bridge. Thus, the slider 63 on the slide wire 65 is connected through the U-shaped member and its other slider 64 to the slide 70 within the measuring head. The slide in turn is connected to the galvanometer through the wire 14 in the cable. The other side of the galvanometer is connected through a small fixed resistor 79A to the slider 73 of the other slide wire 71 on the panel.

Air for the cylinder passes from the source of high pressure air through the filter (which is provided with a vent cock 80 for cleaning purposes), the reducing valve (where it is reduced from its initial pressure of 110 or 250 pounds per square inch gauge to about 30 pounds gauge). The pressure of the air after reduction is indicated by the gauge 21. The air then passes into the flow control mechanism 20A, which comprises a three-way cock 82 provided with an inlet 82A, an outlet 82B and a plunger 83. The inlet and outlet are connected to a "manifold" 84 in the air pipe. As shown in Fig. 6, the plunger is held in an upper or normal position by means of a spring 85 disposed around its stem, but may be depressed by means of a foot lever 86 to allow air to pass through the outlet 82B, the manifold, the air pipe 20, the air hose and the air tube, of the measuring head, to the cylinder. The air forces the piston upwardly, but some of it escapes around the piston and out through the holes in which the feelers are mounted. Air that builds up pressure in the space in the cylinder around the piston is released around the plunger 83 after it has been restored to normal position, i. e., when the foot lever is no longer depressed.

To consider the operation of the apparatus, air supplied to the cylinder through the air tube forces the conical piston upward. The piston, in turn, pushes the feelers outward into contact with the wall of the tube being calibrated, the position of the piston in the cylinder being governed by the cross-section of the tube in contact with the feelers. Likewise, the slider or contactor moves upward in the slide wire in the measuring head and comes to rest at a position on the wire that is governed by the size of the tube cross-section being measured. Movement of the slider unbalances the bridge, which is restored to a balanced condition by moving the slider on the slide wire 71 on the instrument panel, a balanced condition being indicated by zero deflection of the galvanometer.

The cable is calibrated in feet and inches from a zero point at the feelers, so that the distance from the cross-section of the tube being calipered to the end of the tube can be determined directly. When the tube being calipered is disposed vertically the measuring head is lowered into it by means of the cable. When the tube is horizontal or inclined from the vertical to such an extent that the measuring head of its own weight will not slide into the tube, it may be drawn into the tube by a wire or the like attached to its free end, say at the wing nut. In any case, the measuring head will center itself automatically in the tube when the air forces the piston upward. This automatic centering feature of the apparatus is especially advantageous when calipering tubes that are disposed from the vertical.

The calibration resistor and its slider are employed to compensate for wear on the outside ends of the feelers, and the position of the slider 77 is adjusted with the measuring head disposed in a tube of known diameter until a scale 90 attached to the slider of the slide wire 71 reads the actual diameter of this tube. This adjustment need be made only infrequently when substantial wear of the feeler ends is apparent.

Assuming that the calibration resistor has been adjusted a tube calipering operation is conducted as follows:

The galvanometer is adjusted to mechanical zero with the current off, this adjustment being necessary only when the instrument panel has been moved or is not level. The switch on the instrument panel is then closed and the micrometer head is placed in the tube to be calipered at any desired point. This point is determined by reading on the graduated cable. The foot lever on the air control mechanism is depressed so that air is forced into the cylinder, tending to force the piston upward to a position determined by the feelers bearing against the tube wall. This positions the slider on the slide wire within the measuring head and, ordinarily, unbalances the bridge circuit. The balance is restored by adjusting the slider on the slide wire on the instrument panel by means of the knob 73A, which moves the scale. This scale is calibrated in inches and hundredths of an inch and reads the tube diameter directly, the reading appearing at a hair line overlying 91 of the scale. After the reading has been taken, the measuring head is lowered to the next point to be measured in the tube and the procedure is repeated.

The "manifold" 84 does not permit air to bypass the foot controlled valve, i. e. the two ends of the manifold do not connect with each other except through the pipes 82A and 82B. A wall 84A separates the two T's of the manifold from each other. The use of the manifold is preferred because of the rigidity it imparts to the structure, but it need not be employed.

I claim:

1. In a tube caliper, the combination which comprises a cylinder adapted to be disposed within the tube to be calipered, a tapered piston slidable in the cylinder, a plurality of radially spaced feelers projecting through and movable transversely with respect to the wall of the cylinder, the outer ends of the feelers being adapted to engage the inner surfaces of the tube with the interior ends of the feelers bearing against the tapered portion of the piston and slidable with respect thereto, means for holding the feelers against the tapered portion of the piston as it is slid with respect to the cylinder and the feelers, means for forcing a fluid under pressure into the cylinder to slide the piston, and means for determining the relative position of the piston with respect to the cylinder when the feelers are in contact with the inner surface of the tube comprising an elongated calibrated member disposed substantially parallel to the axis of the cylinder and a slider member movable along the calibrated member, one of said members being mounted in fixed relationship to the cylinder and the other of said members being mounted in fixed relationship to the piston.

2. In a tube caliper, the combination which comprises a cylinder adapted to be disposed within the tube to be calipered and having a closed end, a tapered piston slidable in the cylinder, a plurality of radially spaced feelers projecting through and movable transversely with respect to the wall of the cylinder, the outer ends of the feelers being adapted to engage the inner surface of the tube and the inner ends of the feelers being in slidable contact with the tapered portion of the piston, means for forcing fluid under pressure into said closed end of the cylinder for sliding the piston in the cylinder, and means for determining the relative position of the piston with respect to the cylinder when the feelers are in contact with the inner surface of the tube comprising an elongated calibrated member disposed substantially parallel to the axis of the cylinder and a slider member movable along the calibrated member, one of said members being mounted in fixed relationship to the cylinder and the other of said members being mounted in fixed relationship to the piston.

3. In a tube caliper, the combination which comprises a cylinder adapted to be disposed within the tube to be calipered, a conical piston slidable in the cylinder, a plurality of radially spaced feelers projecting through and movable transversely with respect to the wall of the cylinder, the outer ends of the feelers being adapted to engage the inner surface of the tube and the inner ends of the feelers being in contact with the tapered portion of the piston which is slidable with respect thereto, means for moving the sliding piston in the cylinder comprising a long conduit connected with the cylinder, and means for forcing a fluid through said conduit into the cylinder, spring means for holding the inner ends of the feelers in engagement with the conical portion of the piston, and means for determining the relative position of the piston with respect to the cylinder when the feelers are in contact with the inner surface of the tube comprising an elongated calibrated member disposed substantially parallel to the axis of the cylinder and a slider member movable along the calibrated member, one of said members being mounted in fixed relationship to the cylinder and the other of said members being mounted in fixed relationship to the piston.

4. In a tube caliper, the combination which comprises a cylinder adapted to be disposed within the tube to be calipered, a tapered piston slidable in the cylinder, means for sliding the piston in the cylinder comprising an elongated conduit connected to the cylinder, and means for forcing a fluid under pressure through the conduit into the cylinder, a plurality of radially spaced feelers projecting through and movable transversely with respect to the wall of the cylinder, the outer ends of the feelers being adapted to engage the inner surface of the tube with the inner ends of the feelers bearing against the tapered portion of the piston, an electrical resistance element mounted in fixed relationship to the cylinder substantially parallel to the axis thereof, a contact mounted in fixed relationship to the piston and slidable along the resistance element, an electrical circuit connected to the slider and to the resistance element and current indicating means connected in said circuit for indicating changes in current in the circuit brought about as a result of a change in position of the slider with respect to the resistance element.

5. In a tube caliper, the combination which comprises a cylinder adapted to be disposed within the tube to be calipered, said cylinder having a closed end, a tapered piston slidable in the cylinder with its large end adjacent the closed end of the cylinder, a plurality of radially spaced feelers projecting through and movable transversely with respect to the wall of the cylinder, the outer ends of the feelers being adapted to engage the inner surface of the tube with the inner ends of the feelers bearing against the tapered portion of the piston, a conduit inside the cylinder and substantially parallel therewith for supplying fluid under pressure to the cylinder between the large end of the piston and the end of the cylinder and passing through the piston which is slidable thereon, so that the piston tends to slide in the cylinder and on the conduit and force the feelers outwardly against the inner surface of the tube, and means for determining the relative position of the piston with respect to the cylinder when the feelers are in contact with the inner surface of the tube.

6. In a tube caliper, the combination which comprises a cylinder adapted to be passed through the tube to be calipered and having a closed end, a tapered piston slidable in the cylinder, three radially spaced feelers disposed substantially equidistant from each other and projecting through and movable transversely with respect to the wall of the cylinder, the outer ends of the feelers being adapted to engage the inner surface of the tubes with the inner ends of the feelers bearing against the tapered portion of the piston, means for sliding the piston with respect to the cylinder comprising an elongated conduit connected to the closed end of the cylinder with means for forcing a fluid under pressure through the conduit into said closed end, and means for determining the relative position of the piston with respect to the cylinder when the feelers are in contact with the inner surface of the tube including an electrical resistance element disposed substantially parallel to the cylinder and an electrical contact element slidable thereon, one of said elements being mounted in fixed relationship to the cylinder and the other of said elements being mounted in fixed relationship to the piston.

7. In a tube caliper, the combination which comprises a cylinder adapted to be moved lengthwise within the tube to be calipered, a tapered piston slidable in the cylinder, a plurality of radially spaced feelers projecting through and movable transversely with respect to the wall of the cylinder, the outer ends of the feelers being adapted to engage the inner surface of the tube with the inner ends of the feelers bearing against the tapered portion of the piston, means for moving the piston with respect to the cylinder, a first resistance element mounted in fixed relationship to the cylinder and substantially parallel to the axis thereof, a first slider mounted in fixed relationship to the piston and slidable along and in contact with the first resistance element, a bridge network having the first resistance element connected in one leg thereof, a second resistance element connected in the other leg of the bridge network, a second slider movable in contact along the second resistance element, and current indicating means connected between the two sliders.

8. In a tube caliper, the combination which comprises a cylinder adapted to be moved lengthwise of the tube to be calipered, a tapered piston slidable in the cylinder, a plurality of radially spaced feelers projecting through and movable transversely with respect to the wall of the cylinder, the outer ends of the feelers being adapted to engage the inner surface of the tube and the inner ends of the feelers being in contact with the tapered portion of the piston, means for sliding the piston with respect to the cylinder and the inner ends of the feelers, a resistance element in the form of a helix mounted in fixed relationship to the cylinder and substantially parallel to the axis thereof, a slider mounted in fixed relationship to the piston and slidable along and in contact with the first resistance element across the turns of the helix, and an electrical circuit including a current indicating means, said circuit being connected to the slider and the resistance element and adapted to indicate a change in the relative position thereof.

9. In a tube caliper, the combination which comprises a cylinder adapted to be moved lengthwise of the tube to be calipered and having a closed end, a conical piston slidable in the cylinder with its large end adjacent the closed end of the cylinder, a plurality of radially spaced feelers projecting through and movable transversely with respect to the wall of the cylinder, the outer ends of the feelers being adapted to engage the inner surface of the tube and the inner ends of the feelers being in contact with the tapered portion of the piston, means for supplying gas under pressure to a space between the large end of the piston and the closed end of the cylinder, a first resistance element mounted in fixed relationship to the cylinder and substantially parallel to the axis thereof, a first slider mounted in fixed relationship to the piston and slidable along and in contact with the first resistance element, a bridge network having the first resistance element connected in one leg thereof, a second resistance element connected in the other leg of the bridge network, a second slider movable in contact with the second resistance element, and current indicating means connected between the two sliders.

10. In a tube caliper, the combination which comprises a cylinder adapted to be moved lengthwise of the tube to be calipered and having a closed end, a tapered piston slidable in the cylinder with its large end adjacent the end of the cylinder, a plurality of radially spaced feelers projecting through and movable transversely with respect to the wall of the cylinder, the outer ends of the feelers being adapted to engage the inner surface of the tube and the inner ends of the feelers being in contact with the tapered portion of the piston, means for supplying gas under pressure to the space between the closed end of the cylinder and the piston, means for admitting gas from said space into contact with the feelers, a resistance element mounted in fixed relationship to the cylinder and substantially parallel to the axis thereof, a slider mounted in fixed relationship to the piston and slidable along and in contact with the resistance element, an electrical circuit connected to the resistance element and to the slider, and a current indicating means connected in the circuit for determining changes in the circuit brought about by movement of the slider with respect to the resistance element.

11. In a tube caliper, the combination which comprises a cylinder adapted to be disposed within the tube to be calipered, a conical piston slidable in the cylinder, a plurality of radially spaced feelers projecting through and movable transversely with respect to the wall of the cylinder, the outer ends of the feelers being adapted to engage the inner surface of the tube and the inner ends of the feelers being in slidable contact with the conical portion of the piston, means for holding the feelers against the tapered portion of the piston as it is slid on the cylinder, means for sliding the piston in the cylinder to force the feelers outward comprising a concentrically disposed conduit passing through the piston into the cylinder, and means for forcing gas under pressure through the conduit, and means for determining the relative position of the piston with respect to the cylinder when the feelers are in contact with the inner surface of the tube including an electrical resistance element disposed substantially parallel to the cylinder and an electrical contact element slidable thereon, one of said elements being mounted in fixed relationship to the cylinder and the other of said elements being mounted in fixed relationship to the piston.

12. In a tube caliper, the combination which comprises a cylinder adapted to be disposed within the tube to be calipered, a conical piston slidable in the cylinder, a plurality of radially spaced feelers projecting through and movable transversely with respect to the wall of the cylinder, the outer ends of the feelers being adapted to engage the inner surface of the tube and the inner ends of the feelers being in contact with the conical portion of the piston which is slidable with respect thereto, spring means for restraining sliding of the piston in the cylinder, means for admitting gas under pressure into the cylinder to oppose the movement of the piston therein by said spring means, spring means for holding the feelers against the conical portion of the piston, and means for determining the relative position of the piston with respect to the cylinder when the feelers are in contact with the inner surface of the tube including an electrical resistance element disposed substantially parallel to the cylinder and an electrical contact element slidable thereon, one of said elements being mounted in a fixed relationship to the cylinder and the other of said elements being mounted in a fixed relationship to the piston.

VERBA AUSTIN MILLIGAN.